(No Model.)

J. J. HOGAN.
TANK CONNECTION.

No. 473,461. Patented Apr. 26, 1892.

Attest:
L. Lee
Edward T. Kinsey

Inventor.
John J. Hogan, per
Crane & Miller, Attys.

UNITED STATES PATENT OFFICE.

JOHN J. HOGAN, OF BROOKLYN, ASSIGNOR TO THE HOGAN ENGINEERING COMPANY, OF NEW YORK, N. Y.

TANK CONNECTION.

SPECIFICATION forming part of Letters Patent No. 473,461, dated April 26, 1892.

Application filed June 15, 1891. Serial No. 396,357. (No model.)

*To all whom it may concern:*

Be it known that I, JOHN J. HOGAN, a citizen of the United States, residing at Brooklyn, Kings county, New York, have invented certain new and useful Improvements in Tank Connections, fully described and represented in the following specification and the accompanying drawings, forming a part of the same.

The object of this invention is to form a cheap and effective connection for the bottoms of lead tanks; and the invention consists in a collared sleeve provided with a nut and a ring adapted to clamp the lead against the collar without cutting the lead.

The invention will be understood by reference to the annexed drawings, in which—

Figure 1:
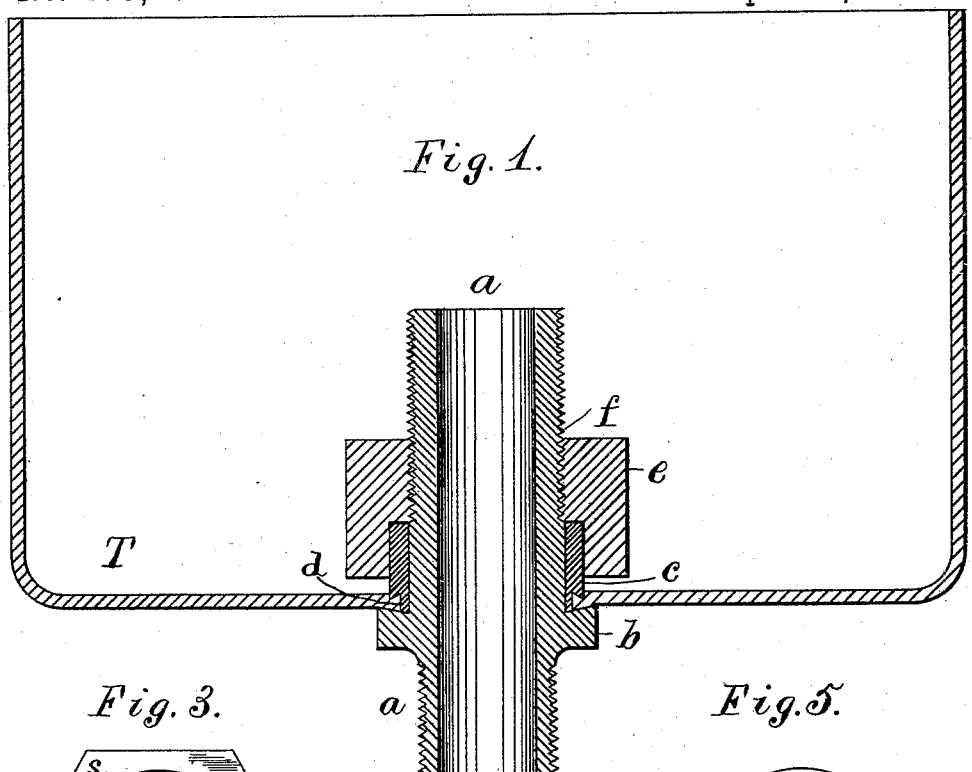
Figure 3:
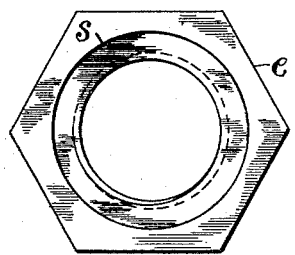
Figure 5:
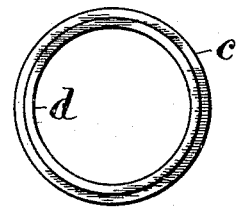
Figure 2:
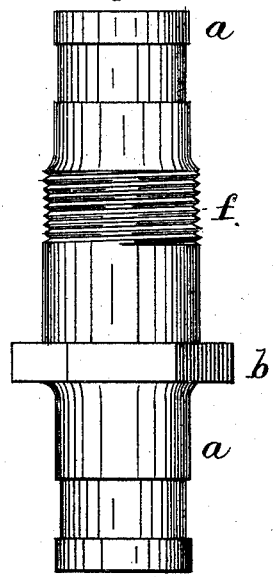
Figure 4:
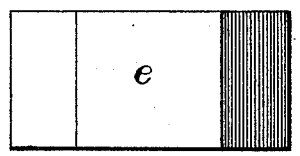
Figure 6:
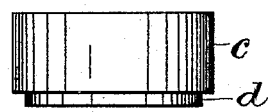

Figure 1 is a section of a tank through the center of the connection. Fig. 2 is an external view of the sleeve with its opposite ends having wide shallow grooves. Fig. 3 is an end view, and Fig. 4 an edge view, of the nut with a conical seat. Fig. 5 is an end view, and Fig. 6 an edge view, of the clamping-ring.

$a$ is the sleeve extended through a hole in the bottom of the tank T, as when a pipe is introduced through the bottom of the tank to connect with a ball-valve or other fixture. The ends of the sleeve may be joined with the necessary connections by screw-couplings when threaded, as shown in Fig. 1, or with conical sleeve-couplings when grooved, as shown in Fig. 2, to fit the coupling devices claimed in my patent, No. 459,907, dated September 22, 1891.

$b$ is a collar upon the sleeve for application to the under side of the tank.

$c$ is a ring fitted to slide upon the sleeve above the collar and adapted to clamp the nut thereto. The exterior of the ring is fitted to a seat $s$ in the lower side of the nut $e$. The nut is fitted to a thread $f$ upon the sleeve, and the ring $c$ is formed with a thin nozzle $d$ at its lower end to prevent the corner of the ring from cutting off the lead. The lower end of the ring is dished, as is also the upper side of the collar $b$, to draw the lead inwardly and prevent it from being squeezed outward by the clamping-pressure.

The connection is used as follows: A hole is formed through the lead to fit the nozzle $d$. The sleeve is inserted in the hole with the collar $b$ underneath the lead, and the ring $c$ is then clamped upon the upper side of the lead by the nut $e$. The outer corner of the ring $c$, where it touches the lead, would readily cut the lead through and destroy the connection except for the nozzle $d$, which passes through the hole formed in the lead and makes a contact with the collar $b$ when the lead is securely clamped. To effect the required clamping-pressure, the nozzle $d$ is made of less projection from the end of the collar than the thickness of the lead, and such projection may be readily varied to suit sheet-lead of different thicknesses by filing off the nozzle to a suitable length, when the connection is applied. If the nut $e$ were integral with the clamping-ring $c$, the latter would rub upon the lead when rotated in such manner as to tear and disfigure the same.

By making the ring $c$ separate from the clamping-nut the ring is pressed without rotation upon the sheet metal and the latter is pinched without injury.

It will be readily understood that this tank connection may be applied to zinc, copper, or sheet-iron with the same results as to lead by making the nozzle $d$ of length less than the thickness of the sheet metal, and that the essential advantage of the invention in all cases consists in the rotation of the clamping-nut to press the clamping-ring $c$ toward the sheet metal without turning the ring upon such metal.

Having thus set forth my invention, what I claim herein is—

1. The combination, with the sleeve $a$, having the collar $b$, of the clamping-ring $c$, provided with nozzle $d$, and the nut $e$, fitted to a thread upon the sleeve and to the exterior of the ring, as and for the purpose set forth.

2. The combination, with the sleeve $a$, having the collar $b$, dished upon its upper side, of the clamping-ring $c$, provided with the nozzle $d$ and dished upon the projecting portion outside the nozzle, and the nut $e$, fitted to a thread upon the sleeve and to the exterior of the ring and adapted to press the ring toward the collar $b$, as and for the purpose set forth.

JOHN J. HOGAN.

In presence of—
L. C. DAWES,
T. S. CRANE.